US007958647B2

(12) United States Patent
Gerner

(10) Patent No.: US 7,958,647 B2
(45) Date of Patent: Jun. 14, 2011

(54) LOCK-BUMPING AND LOCK-PICKING DETECTION

(75) Inventor: Nathan Gerner, Waukesha, WI (US)

(73) Assignee: Honeywell International Inc., Morristown, NJ (US)

( * ) Notice: Subject to any disclaimer, the term of this patent is extended or adjusted under 35 U.S.C. 154(b) by 246 days.

(21) Appl. No.: 12/328,396

(22) Filed: Dec. 4, 2008

(65) Prior Publication Data

US 2010/0139340 A1 Jun. 10, 2010

(51) Int. Cl.
*G01B 1/00* (2006.01)

(52) U.S. Cl. ........................................ 33/540; 340/5.61

(58) Field of Classification Search ............ 33/539–540; 70/378, 394, 494; 340/5.1, 5.2, 5.6, 5.61, 340/5.64, 5.7

See application file for complete search history.

(56) References Cited

U.S. PATENT DOCUMENTS

| | | | | |
|---|---|---|---|---|
| 3,500,326 | A * | 3/1970 | Benford | 235/444 |
| 3,631,301 | A * | 12/1971 | Goldman | 361/171 |
| 3,764,859 | A * | 10/1973 | Wood et al. | 361/172 |
| 3,782,148 | A * | 1/1974 | Goldman | 70/278.3 |
| 3,911,397 | A * | 10/1975 | Freeny, Jr. | 340/5.25 |
| 4,050,063 | A * | 9/1977 | Schull | 235/382 |
| 4,322,719 | A * | 3/1982 | Moorhouse | 235/382 |
| 4,489,359 | A * | 12/1984 | Suzuki | 361/172 |
| 4,591,852 | A * | 5/1986 | Brod | 340/5.32 |
| 4,789,859 | A * | 12/1988 | Clarkson et al. | 340/5.65 |
| 4,833,465 | A * | 5/1989 | Abend et al. | 340/5.65 |
| 4,912,460 | A * | 3/1990 | Chu | 340/5.67 |
| 4,931,789 | A * | 6/1990 | Pinnow | 340/5.64 |
| 5,309,152 | A * | 5/1994 | Krucoff | 340/5.67 |
| 5,691,711 | A * | 11/1997 | Jorgensen | 340/5.67 |
| 5,771,722 | A * | 6/1998 | DiVito et al. | 70/277 |
| 6,237,379 | B1 * | 5/2001 | Hotzl | 70/279.1 |
| 6,382,007 | B1 * | 5/2002 | Wright | 70/394 |
| 6,496,101 | B1 * | 12/2002 | Stillwagon | 340/5.61 |
| 6,975,202 | B1 * | 12/2005 | Rodriguez et al. | 340/5.25 |
| 2004/0051380 | A1 * | 3/2004 | Okada | 307/10.5 |
| 2005/0144995 | A1 * | 7/2005 | Russell et al. | 70/278.3 |
| 2009/0025435 | A1 * | 1/2009 | Popowski | 70/91 |
| 2010/0077809 | A1 * | 4/2010 | Gerner et al. | 70/278.2 |
| 2010/0148918 | A1 * | 6/2010 | Gerner et al. | 340/5.2 |

OTHER PUBLICATIONS

"Master Lock®Bump Stop Security"website, (dated 2008).

* cited by examiner

*Primary Examiner* — G. Bradley Bennett
*Assistant Examiner* — Tania C Courson
(74) *Attorney, Agent, or Firm* — Husch Blackwell

(57) ABSTRACT

A system for controlling access to a secure area includes a lock and an electronic access device for controlling access to a secure area. The lock includes pins for locking and unlocking the lock. The access device communicates with the pins for electrically measuring movement of the pins. The access device stores an unlock pin code for the predetermined position of the pins for unlocking the lock. The electronic access device electrically measures pin movement by a key. A control device electrically communicates with the electronic access device for determining when a lock compromising technique has occurred to identify a lock tamper event.

17 Claims, 10 Drawing Sheets

LOCK-BUMPING AND LOCK-PICKING DETECTION

CROSS REFERENCE TO RELATED APPLICATION

This application is related to commonly-owned, co-pending U.S. patent application Ser. No. 12/241,959 filed on Sep. 30, 2008, the entire contents and disclosure of which is herein expressly incorporated by reference in its entirety.

FIELD OF THE INVENTION

The present invention relates to monitoring access control systems for a tamper event, and more particularly, relates to monitoring access control systems having both mechanical security and electronic access control for a tamper event and unauthorized entry.

BACKGROUND OF THE INVENTION

Current access control systems may electronically monitor and control access at an entryway to a secure area using, for example, a reader for reading an access card. Additionally, however, the secure area controlled by the access control system may include one or more entryways having a mechanical lock. For example, doors may have both mechanical security, e.g., a lock, and electronic access control, in this case, the mechanical lock mechanism takes precedence over the access control logic. Additionally, the doors having a lock may be opened by unlocking the lock using a typical door key, or alternatively a master key which overrides the access control system. Alternative access control systems and security systems may include electronically activated mechanical locks. Such control systems may also include multiple entryways, for example, on a floor of a building or the entire building, for example, as shown in commonly-owned, and co-pending U.S. patent application Ser. No. 11/782,557, the entire contents and disclosure of which is expressly incorporated by reference herein in its entirety. If a monitoring system has a door position switch, the system will have a record of the door opening, but not an identity and record of the key which opened the lock mechanically. Further, in an access control system which has a door position switch, the door opening event will appear as a forced entry. A shortcoming of such systems is that a person who is authorized to enter and uses the key entry, either a typical key or a master key, will trigger the forced entry alarm.

Additionally, an access control system may monitor the mechanical lock and identify and authenticate a key entry, as in the commonly owned application (U.S. Ser. No. 12/241,959) incorporated by reference above. However, a shortcoming of monitoring systems for mechanical locks occurs when a mechanical lock compromising technique is used to open the lock, such as lock-picking and lock-bumping. Current monitoring methods do not differentiate a valid key from lock compromising technique such as a bump key used in lock bumping, or a lock pick technique using a lock pick, and thus do not adequately detect lock compromising techniques. This situation is disadvantageous since the accuracy of the access control system is compromised due to an entry which is mistakenly identified as a valid key entry.

It would therefore be desirable to provide a method and access control system utilizing the method for identifying a lock tamper event when a lock compromising technique is attempted on a door lock. It would further be desirable for the method and access control system to initiate a tamper event signal to a monitoring station. It would also be desirable for the method and access control system to identify a lock tamper event when a lock compromising technique is attempted on a governing cylinder of a door lock.

SUMMARY OF THE INVENTION

In an aspect of the invention, a security system for monitoring access to a secure area includes a lock having a locked and unlocked position for controlling access to a secure area. The lock includes pins for locking and unlocking the lock, and the pins include a predetermined position for unlocking the lock. The lock defines a key passageway for unlocking the lock using a key. An electronic access device communicates with the pins for electrically measuring movement of the pins and determining an unlock pin code from the predetermined position of the pins for unlocking the lock. The electronic access device electrically measures pin movement by a lock opening element inserted into the key passageway. The electronic access device generates a pin movement data set from measuring the pin movement. A control device electrically communicates with the electronic access device. The control device compares the pin movement data set to at least one predetermined security event pin movement data set and determines when the pin movement data set matches the security event pin movement data set for initiating a tamper alert signal.

In a related aspect, the predetermined security event pin movement data set includes a specified pin movement pattern. Further, the control device compares the pin movement data set to the pin movement pattern of the predetermined security event pin movement data set to determine the security event. In another related aspect, the control device identifies a lock compromising technique when the pin movement data set includes a series of movements of the pins in a specified period of time. A lock bumping technique may be used for compromising the lock and includes a pin movement data set having a smaller period of time than a period of time for a lock picking technique for compromising the lock. The control device may identify a lock picking technique for compromising the lock when the pin movement data set includes pin movement in a predetermined period of time. The electronic access device may electrically measures pin movement by a key and determine a key code for the key from pin movement. Further, the control device may control access to the secure area using at least one governing pin in the lock, and the control device may allow access using the governing pin when the key code matches the unlock pin code and denies access using the governing pin when the key code does not match the unlock pin code. The control device may communicate an alert signal to a remote monitoring station. A plurality of lock opening elements may include the key, a modified key for initiating a lock bumping technique for compromising the lock, and a lock pick for initiating a lock picking technique for compromising the lock. The control device may identify pin movement from a valid key inserted into the key passageway as matching the unlock pin code, and the control device may identify pin movement from an invalid key inserted into the key passageway as not matching the unlock pin code.

In another aspect of the invention, a method for monitoring access to a secure area includes the steps of: controlling access to a secure area using a lock having a locked and unlocked position, the lock including pins for locking and unlocking the lock, the pins including a predetermined position for unlocking the lock, the lock defining a key passageway for unlocking the lock using a key; electrically measuring movement of the pins and determining a unlock pin code from the predetermined position of the pins for unlocking the lock using an electronic access device communicating with the pins; electrically measuring pin movement by a lock opening element inserted into the key passageway using the electronic access device; generating a pin movement data set from measuring the pin movement using the electronic access device; comparing the pin movement data set to at least one predetermined security event pin movement data set using a control device electrically communicating with the electronic access device; and determining when the pin movement data set matches the security event pin movement data set for initiating a tamper alert signal.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
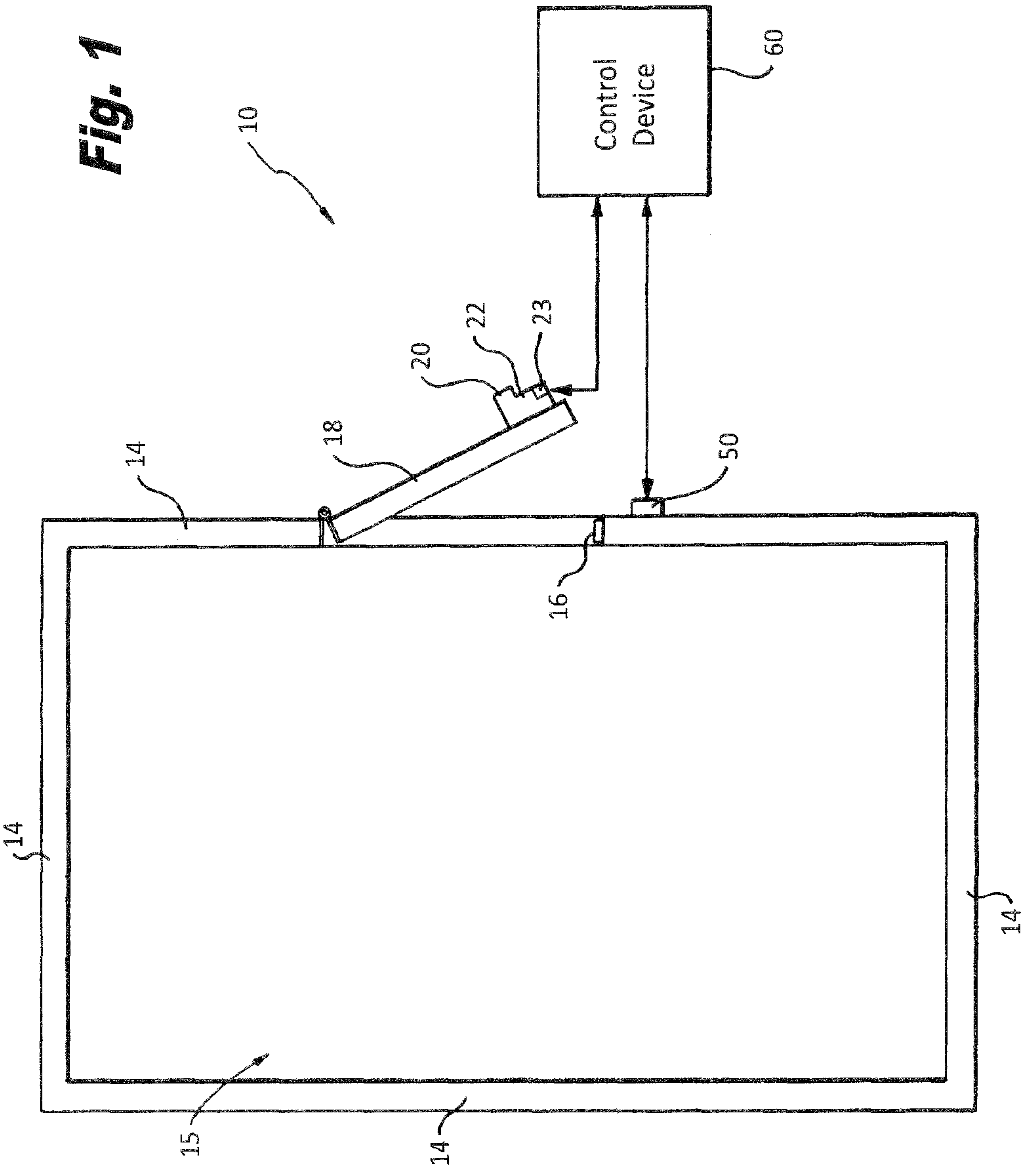
FIG. 1 is a block diagram of a system for controlling access to a secure area according to an embodiment of the invention.
Figure 2:
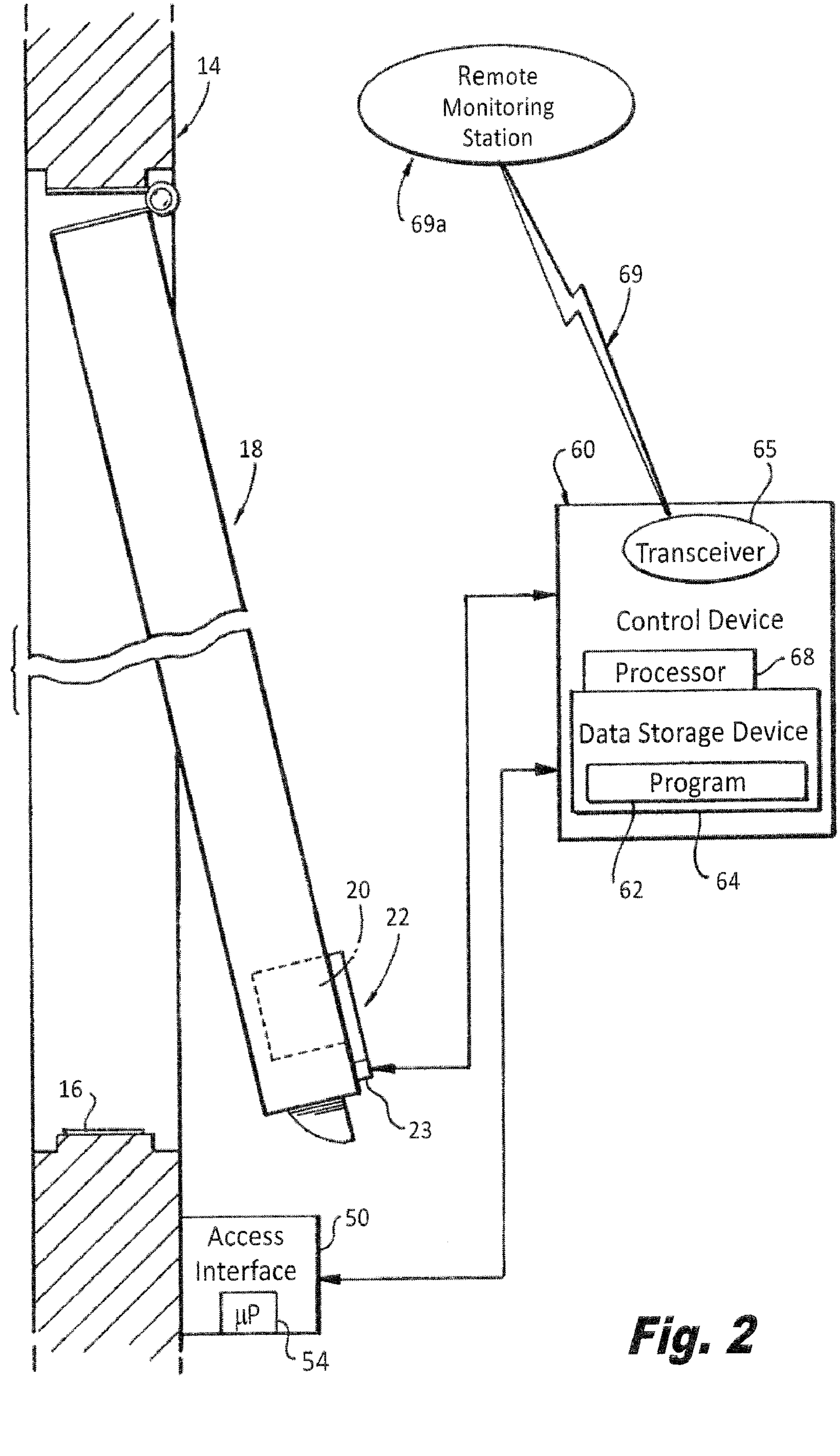
FIG. 2 is side elevational view of a door strike, door, access device, and access interface and a detail block diagram of a control device, of the system shown in FIG. 1.
Figure 3:
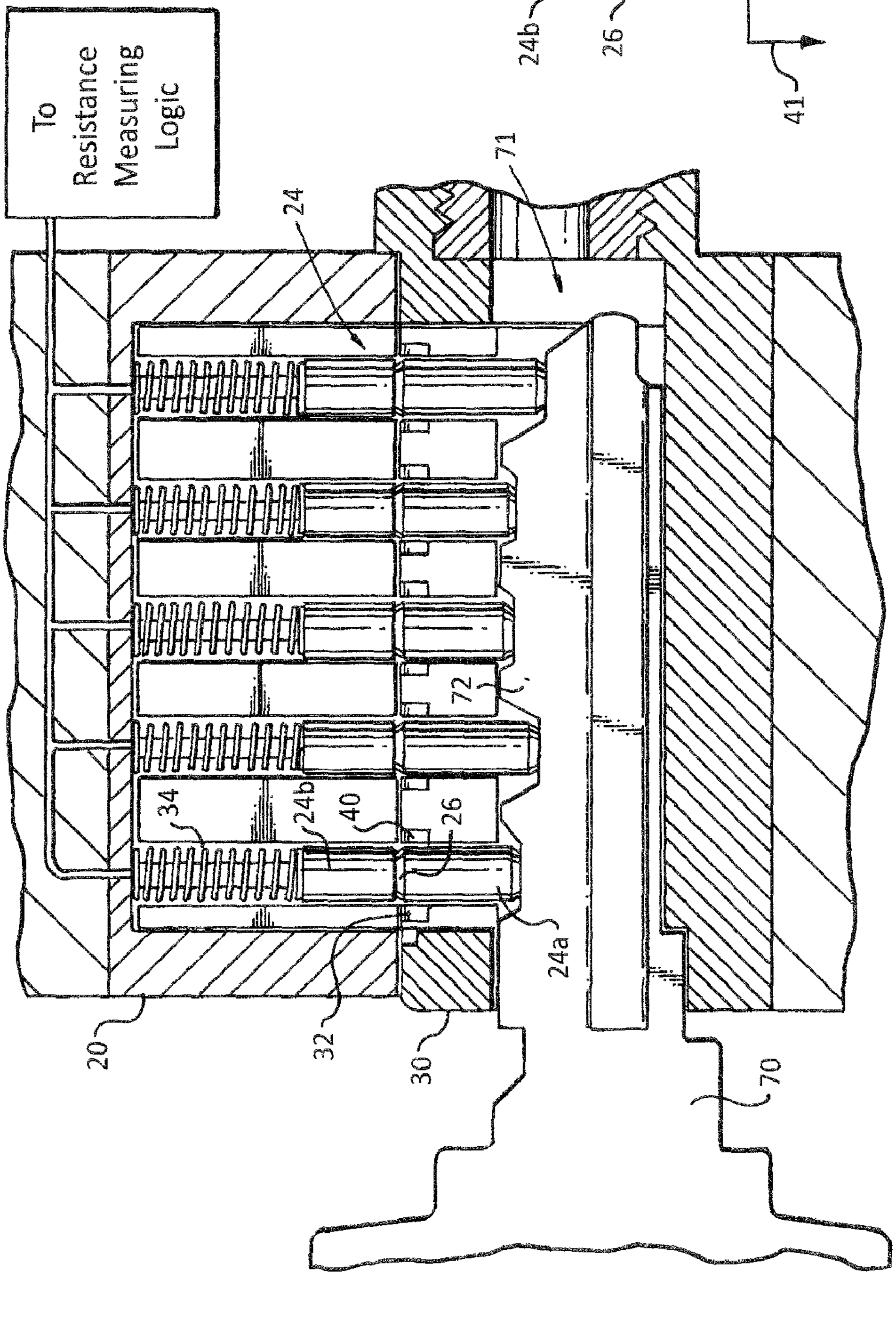
FIG. 3 is a perspective view of a lock using a measuring device for measuring resistance.

Referring to FIGS. 1-3, according to one embodiment of the present invention, a system 10 for controlling access to a secure area 14 includes an entryway embodied as a door 18. The door 18 includes a lock 20 having a locked and unlocked position for controlling access to the secure area 14. The lock 20 includes pins 24 divided into driver pins 24*a* and key pins 24*b* (FIG. 3) for locking and unlocking the lock 20. The lock 20 further includes predetermined pin positions for unlocking the lock 20 along a shear line 32 (FIG. 3). An electronic access device 22 communicates with the pins 24 for electrically measuring movement of the pins for determining a pin code for each pin related to the predetermined pin positions for unlocking the lock 20. The electronic access device 22 also measures pin movement caused by an element or instrument inserted into a key passageway 71 (shown in FIG. 3) which may be used for compromising the lock as is discussed in greater detail hereinbelow. A key 70 having teeth 72 moves the pins in their respective cylinder housings 36, after insertion into the passageway 71. A key code for the key 70 from the pin movement is determined by the electronic access device 22. The access device 22 includes a microprocessor 23 for analyzing and determining the measurement of the movement of the pins 24 and determining the pin code.

A control device 60 electrically communicates with the access device 22. The control device 60 identifies the key code received from the access device 22 and verifies the key code, i.e., the pin 24 movement measurement. When the key 70 is inserted into the key passageway of the lock 20, the control device 60 determines whether the key code matches the predetermined pin code. Thereby, the control device 60 identifies and verifies or authenticates the key 70. Additionally, the control device 60 records entry into the secure area 14 using either card access or key entry.

Further, the control device 60 uses the key code data from the access device 22 for identifying when the lock 20 is opened, or an attempt to open the lock is made using lock compromising techniques. Lock compromising techniques may include an unidentified key, for example, a false or blank key used to compromise the lock, or a lock picking technique. More specifically, the pin 24 movement may indicate a tamper event using a modified key, invalid key, or lock compromising instrument such as a lock pick. The pin movement from a tamper event may also be caused by a combination of a lock compromising instrument, such as a modified key, and a lock compromising technique, for example, lock bumping, described in greater detail hereinbelow. Lock picking techniques use lock picks to manipulate the components, i.e., the pins, of the lock 20 without the original or authorized key. Lock picks may include many varieties such as a hook pick having a hook shape or a tension wrench for applying pressure to the lock pins. The lock pick is placed in the key passageway 71 and each of the pins are manipulated to align with the shear line so that the cylinder will turn and the lock open.

Thus, the control device 60 identifies when there is an attempt to open the lock 20, which may be caused by a user inadvertently inserting the wrong key into the lock, or a deliberately attempted unauthorized entry. Further, the control device 60 identifies when an attempt to open the lock is actually successful at opening the lock. Additionally, the control device 60 identifies when a tamper event has occurred, which may result in the lock being compromised or opened, or the lock not opening which would be identified as an attempt to open the lock. Such unwanted attempts and successes at opening the lock 20 by compromising the lock may include, for example, lock picking and lock bumping techniques.

Referring to FIG. 2, an access interface embodied as a reader 50 communicates with the control device 60 and includes a microprocessor 54. A user provides identification to gain entry into the secure area 15 by presenting, for example, an access identification (ID) card (not shown) for swiping through the reader 50. The access device 50 includes the microprocessor (μP) 54 for reading the ID card and communicating with the control device 60. The access device 50 communicates with the control device 60 which analyzes and identifies the ID card. A program 62 saved on computer readable medium embodied as a data storage device 64 and executed by a processor in the control device 60 provides the analysis of the data communicated by the access device 50.

Figure 4:
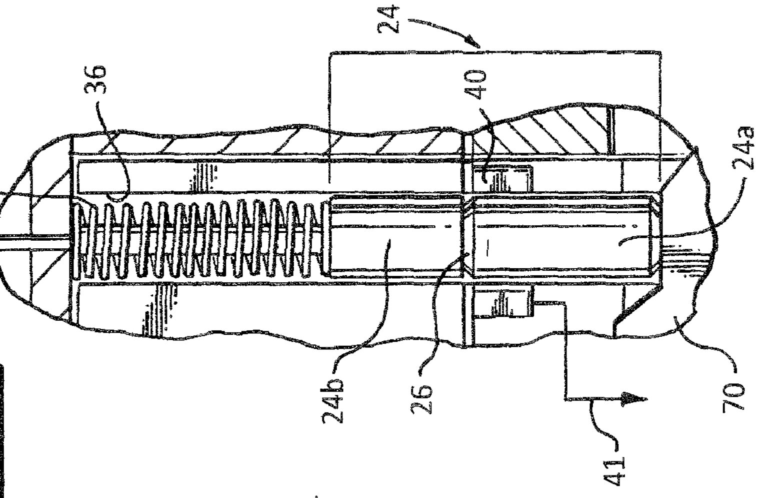
FIG. 4 is a detail perspective view of a pin, spring and cylinder housing shown in FIG. 3.

Referring to FIGS. 3 and 4, each of the pins 24 includes a shear point 26. The lock 20 includes an internal rotatable cylinder 30 defining a shear line 32 between the lock 20 and the rotatable cylinder 30. The lock 20 is opened by aligning the pin shear points 26 with the shear line 32 using the key 70 and rotating the cylinder 30. Springs 34 are positioned in cylinder housings 36 and mate with the top of each pin 24 for providing mechanical resistance to the pin moving upward in the cylinder housing 36.

In one embodiment of the invention, referring to FIGS. 3 and 4, resistance is measured on each pin 24 using a measuring device 40. The resistance increases as the pin 24 is pushed up upwards in the cylinder housing 36. The microprocessor 23 of the access device 22 processes the measurement of the pin 24 movement using the resistance measurement, and determines the key code from the pin movement. The key code is communicated 41 to the control device 60 for identifying and verifying the key and recording the entry into the secure area 15. Thus, the access control system 10 maintains accountability for any card holder or key holder entering through the door. In other embodiments of the invention, tension or capacitance, for example, can be measured to determine pin 24 movement and thereby a key code, as described in related application Ser. No. 12/241,959 incorporated by reference hereinabove.

Figure 5:
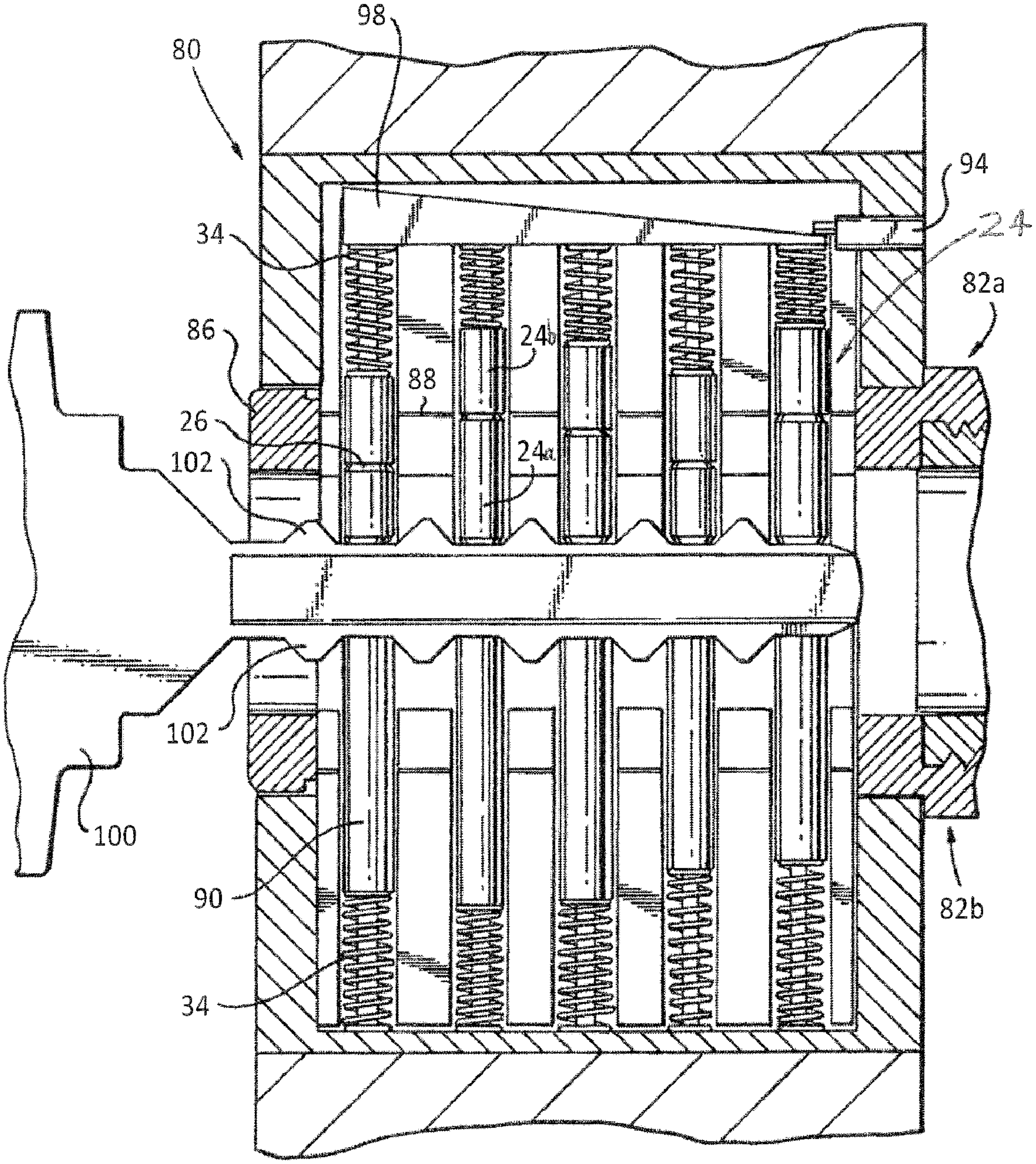
FIG. 5 is a perspective view of another embodiment of a lock according to the invention using an actuator and spring platform.
Figure 6A:
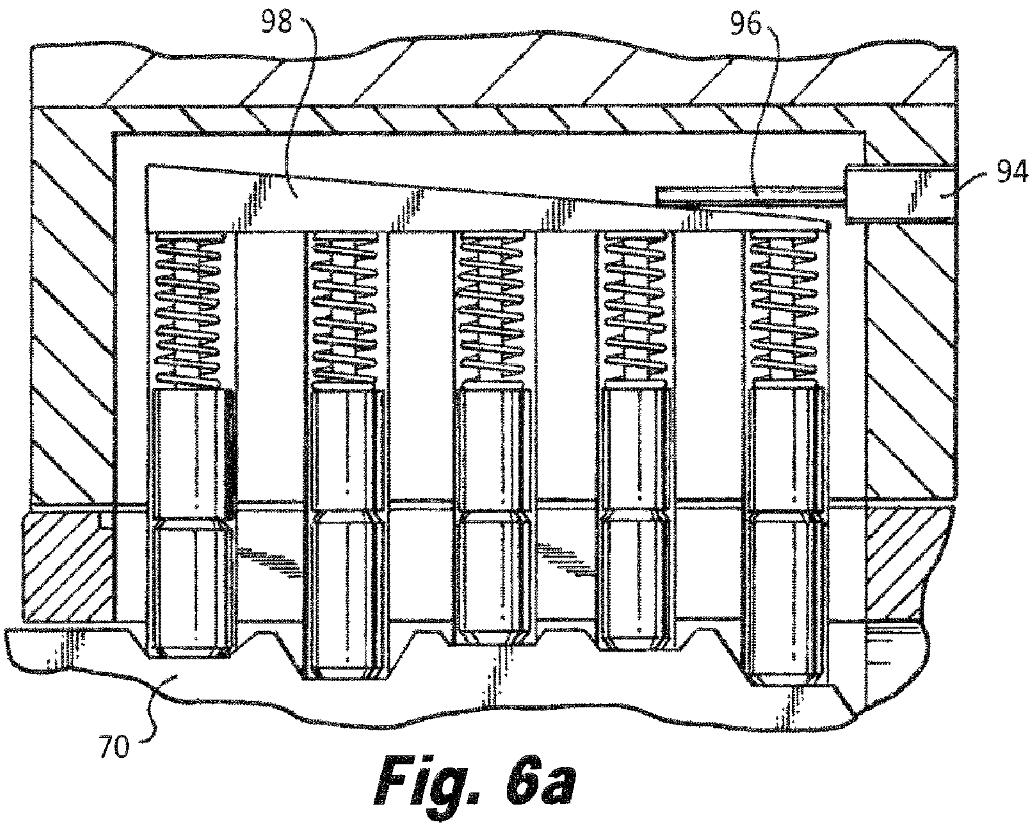
FIG. 6*a* is a detail block diagram of the spring platform and the actuator shown in FIG. 5 having an extended rod.
Figure 6B:
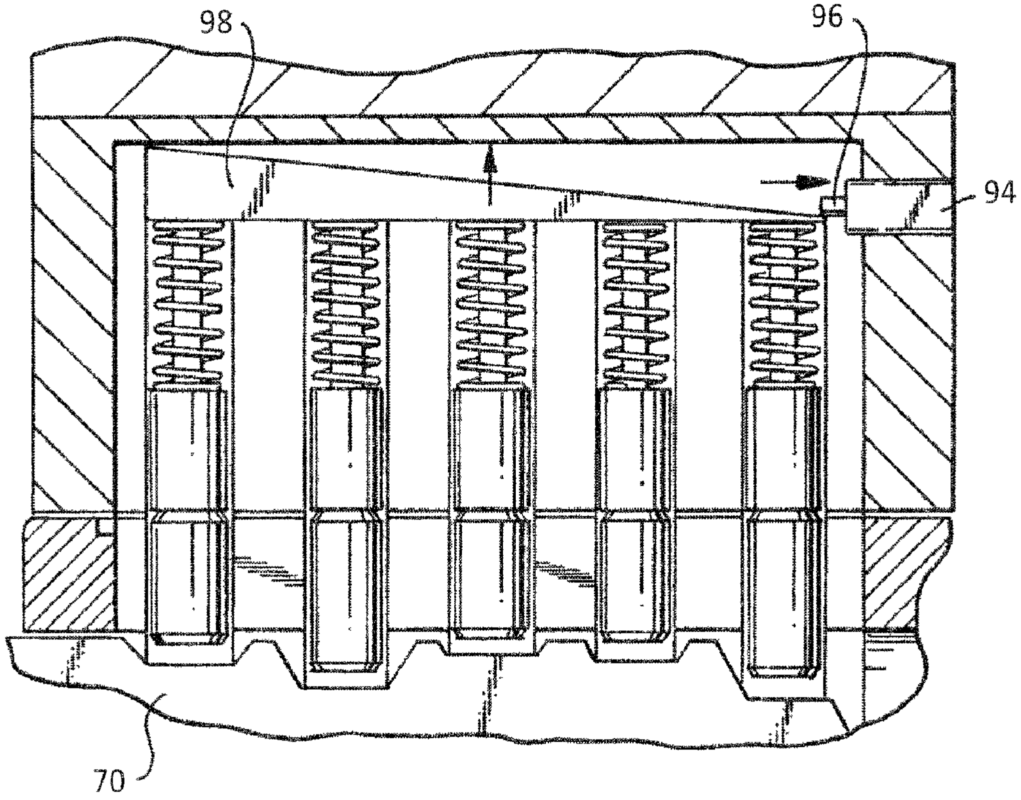
FIG. 6*b* is a detailed block diagram of the spring platform and actuator shown in FIG. 6*a* having the rod retracted.

Referring to FIGS. 5, 6*a* and 6*b*, another embodiment of the invention includes a lock 80 including a cylinder 86 having an upper part 82*a* and a lower part 82*b*, where like elements to the lock 20 shown in FIGS. 3-4 have the same reference numerals. The lock 80 includes pins 24 with shear points 26 in the upper part 82*a* of the cylinder 86, and solid pins 90 in the lower part 82*b* of the cylinder 86. The solid pins 90 are positioned in cylinder housings 92 which rotate with the cylinder 86 when a master key 100 opens the lock 80. The master key 100 is double sided, i.e., has teeth 102 opposite one another. The solid pins 90 do not have a shear point as the pins 24 in the upper part 82*a* of the cylinder 86. The solid pin 90 movement in the cylinder housing 92 is measured to identify the master key 100. If the master key 100 key code or identification generated by the solid pins 90 matches an unlock pin code or authorized identification numbers, then the control device 60 unlocks the lock by moving the shear points 26 of the pins 24 in alignment with the shear line 88. In this embodiment, the pins 24 act as governing pins controlled by the control device 60. When the shear points 26 of the pins 24 and the shear line 88 are aligned, the cylinder 86 will turn and unlock the lock 80. Thus, a key code is generated from the master key 100 which is identified, recorded and verified by the control device 60.

In an alternative embodiment, the master key 100 may press on the pins 90 having the shear points 26. For example, non-master keys or normal keys 70 (as shown in FIG. 3) will use the solid pins 90, and the actuator 94 can retract for normal keys when the key code is valid. With the master key 100, the lock 80 may be unlocked mechanically by lining up the shear pins 26 of the pins 24. Therefore, master keys would be the only keys that would work, for example, during a power failure, when the door is unable to electrically measure the solid pins 90.

Additionally, referring to FIGS. 6*a* and 6*b*, the shear pins 24 are mounted to a spring board 98 which is controlled by a solenoid or actuator 94 connected to the control device 60 for controlling the shear pins 24. The actuator 94 uses an extendable rod 96 to push the spring board 98 in the downward direction as shown in FIG. 6*a*, pushing the shear points 26 of the pins 24 below the shear line 88 and locking the lock 80 (FIG. 5). When the actuator 94 retracts the rod 96, the spring board 98 moves upward aligning the shear points 26 of the pins 24 with the shear line 88 of the lock 80 for unlocking the lock 80, as shown in FIG. 6*b*.

Figure 7:
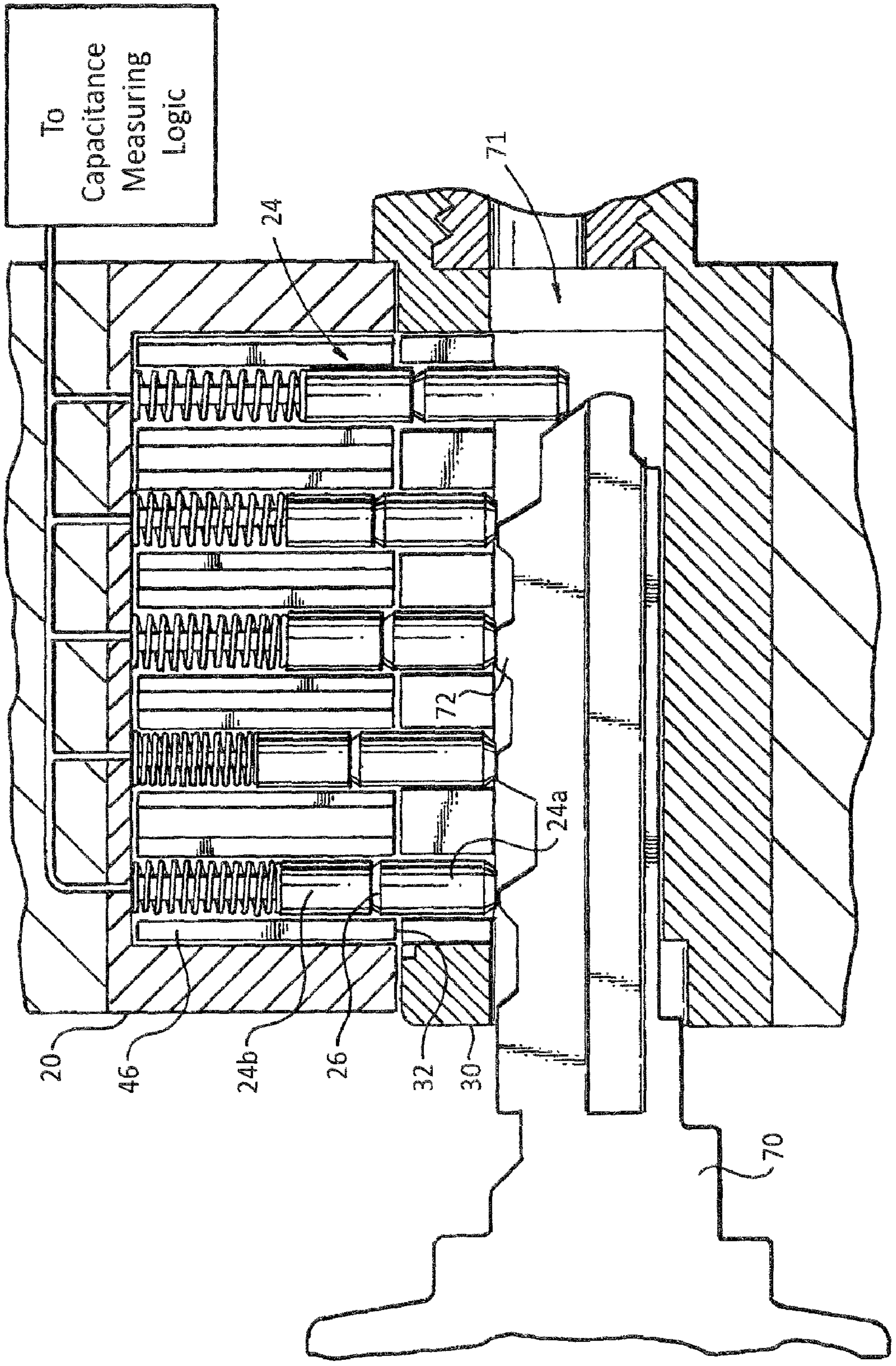
FIG. 7 is a perspective view of an embodiment of the invention wherein the key is not fully inserted into the key passageway.
Figure 8:
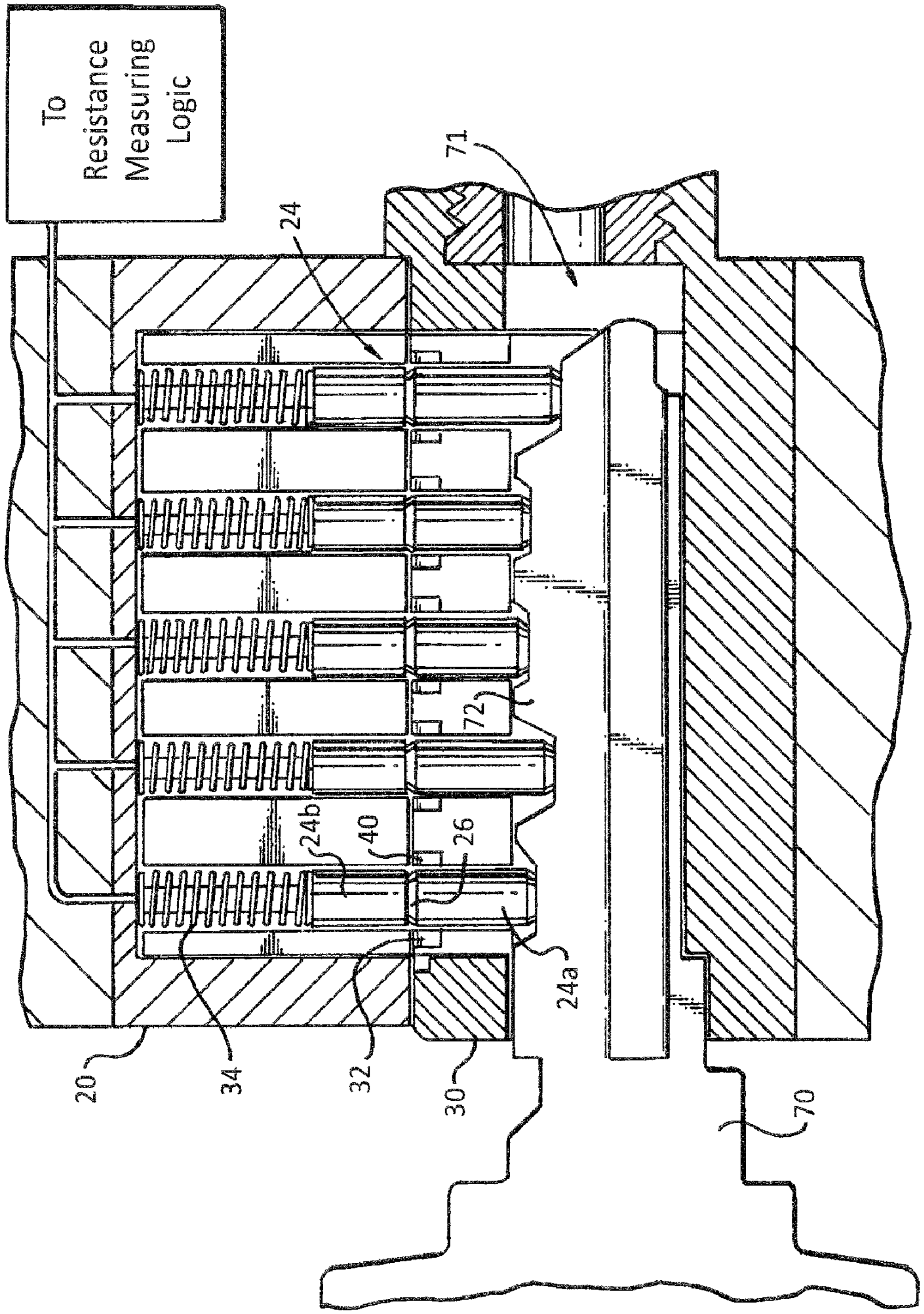
FIG. 8 is a perspective view of the lock shown in FIG. 7, having the key inserted completely into the passageway depicting a lock bumping lock compromising technique.

Referring to FIG. 7, a key 70 is partially inserted into a key passageway 71 of the lock 20. One example of compromising a lock is called lock bumping, and uses a partially inserted key 70 as shown in FIG. 7. Lock bumping generally requires a bump key embodied as the key 70, which may be crafted from an existing key and filed or modified for use in compromising the lock 20. The bump key is inserted into the key passageway 71 and placed with one or more notches or teeth 72 of the key 70 out of the passageway 71. The key is then knocked or bumped fully into the key passageway 71, as shown in FIG. 8. The teeth 72 of the key 70 drive the pins 24 in the lock 20 upwards, the driver pins 24*a* and the key pins 24*b* separate at the shear line 26, allowing a rotating force applied to the key to turn the cylinder 30 opening the lock 20. The control device records the pin 24 movements and determines when a tamper event occurs by analyzing a pin movement pattern.

Examples of three different methods of compromising or obtaining unauthorized access through a key lock, and how the access control device 60 identifies the events include, lock picking, lock bumping, and lock picking or bumping governing pin(s). Traditional lock picking typically includes an intruder presses each pin up into their respective cylinder until the shear points of all the pins are lined up correctly. The system 10 of the present invention identifies when traditional lock picking is being attempted. When a key is inserted into a lock, a key code or identification number will change from 00000 to the key code or identification number quickly. When a lock is being picked, the measured identification number will change over time by one pin at a time. For example, over the course of several seconds, the identification number will change as: X000, XX000, XXX00, XXXX0, XXXXX (where X is a number between 1 and 9). If only one pin or several pins are being pressed over a long period of time, then a traditional lock pick alert will be initiated by the access control device 60. Regarding lock bumping, typically an intruder grinds down a normal key to have very small bumps where the key presses on the pins, which is basically a key with identification number 11111. The intruder inserts the key into the lock, and then pulls the key back slightly before bumping the key, or rapidly inserting the key 70 into the key passageway 71 (FIGS. 7 and 8). Thus, as a bump key is inserted, the measured identification number will be 10000, 11000, 11100, 11110, and 11111. As no normal key has this kind of identification number, a lock bump alert will be initiated by the access control device 60. Also, when the key 70 is bumped or rapidly inserted into the key passageway 71, the pins will jump upwards in their respective cylinders and have very quick random values. Conducting periodic sampling of the pin movements will identify this type of pin movement, i.e., quick random values. Another example of compromising a lock is lock picking or bumping governing pins 90 (shown in FIG. 5). The governing pins 90 are only pressed by master keys. The master key also has an identification number that is measured by movement of the pins 24. An intruder may attempt traditional lock picking or bumping on the governing pins by lining up the pins along the shear line. In this case, the lock 20 will be compromised (unlocked), but the identification number will be 00000 or another unauthorized number XXXXX because the measured pins 24 will not move, or move with an unidentified key. In order to detect when the cylinder 30 is turned, a status switch may be added to the lock 20 that indicates when the cylinder 30 is turned. If the cylinder 30 is in an unlocked position and an unauthorized identification number is detected, then a governing pin tamper alert is initiated by the access control device 60.

Figure 9:
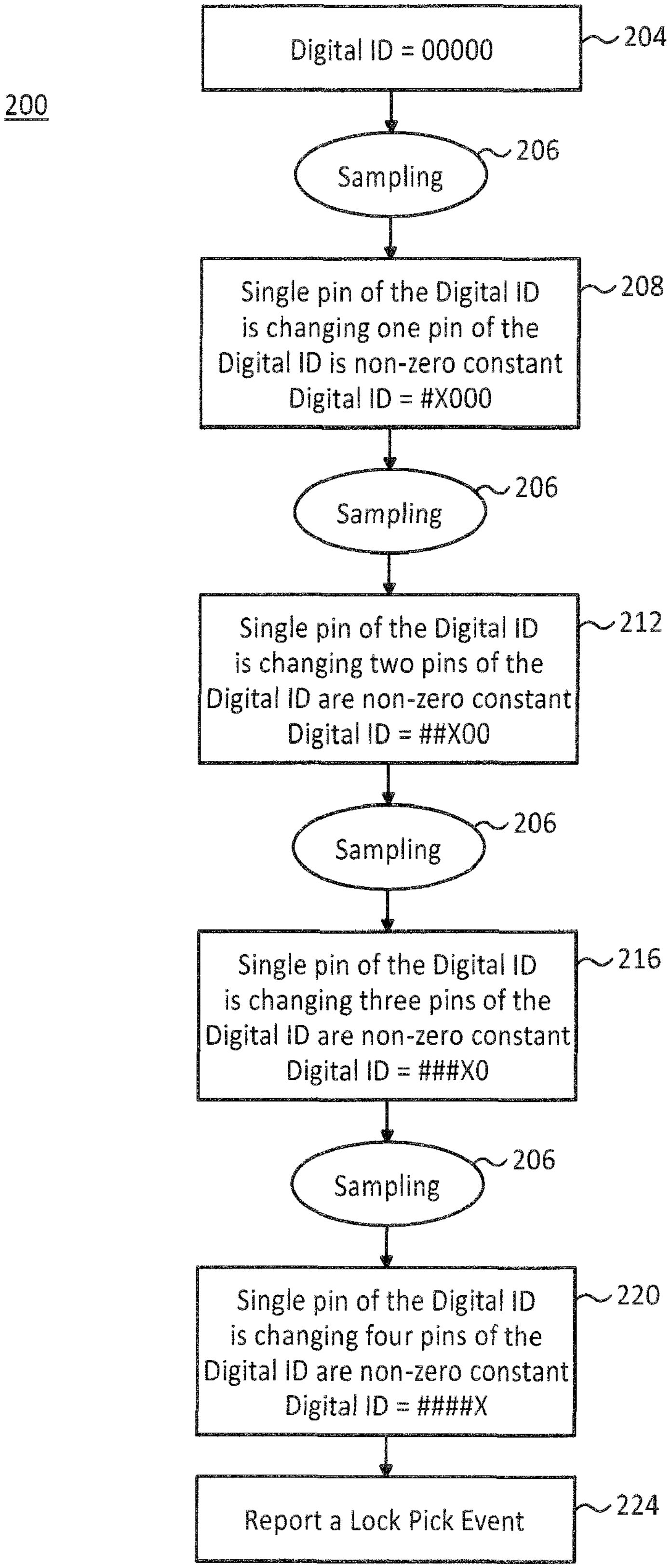
FIG. 9 is a flow chart of a method according to an embodiment of the invention including lock picking.

Referring to FIG. 9, a flow chart of an embodiment of a method 200 for monitoring a security system which includes a mechanical lock. The method 200 is an example of detection of lock picking to compromise a lock. The method 200 includes in step 204, a digital identification (ID) of all zeros relating to the pins 24 in the lock 20. A digital ID of all zeros indicates that there is no key in the lock, as each number represents a pin. If all the pins 24 are pushed to their highest level, the digital ID will be 99999. The digital ID of all zeros represents the pins 24 at rest (as in FIG. 7) and in the locked position, i.e., their shear points 26 not in alignment with the shear line 32. A sampling of the pin positions is initiated by the control device 60, in step 206, using the access device 22 to periodically determine current pin 24 positions in the lock 20. The sampling step 206 may be set to occur at specific times and at desirable intervals or frequencies.

Alternatively, the sampling steps 106 may be part of the computer software program 62 in the control device 60. The software program 62 can be programmed to initiate sampling of the pin 24 movement using the access device 22, for example, at specific times, or periodically. The method 200 illustrates an exemplary series of steps for sampling the pins, however, other sequences and sample steps are within the scope of the present invention. Similarly, alternative lock compromising methods may be employed which are detectable using the present invention other than the exemplary lock compromising methods of lock picking, lock bumping, and tampering with governing pins as described herein.

In step 208, the control device 60 detects a single pin of the digital ID is changed, that is, one pin has indicated a non-zero in addition to a non-zero constant, and thus reads #X000 where # represents the non-zero digit. Another sampling step 106 is initiated by the control device 60 after step 208. In step 212 another pin of the digital ID is determined to have changed, resulting in two pins being non-zero, reading ##X00. After another sampling step 106, step 216 of the method 200 determines that the digital ID of another pin has changed from zero to a non zero number, reading ###X0, and thus three pins are non-zero. A further sampling step 106 results in the digital ID of another pin changing form zero to a non-zero number, reading ####X, in step 220. Thereafter, in step 224, the control device 60 initiates a tamper event signal, in this example a lock pick tamper event to a receiving device. The receiving device may be, for example, a mobile phone, a beeper, a receiving station or remote monitoring station, or a local or remote alarm device initiating an audible and or visual alarm.

Figure 10:
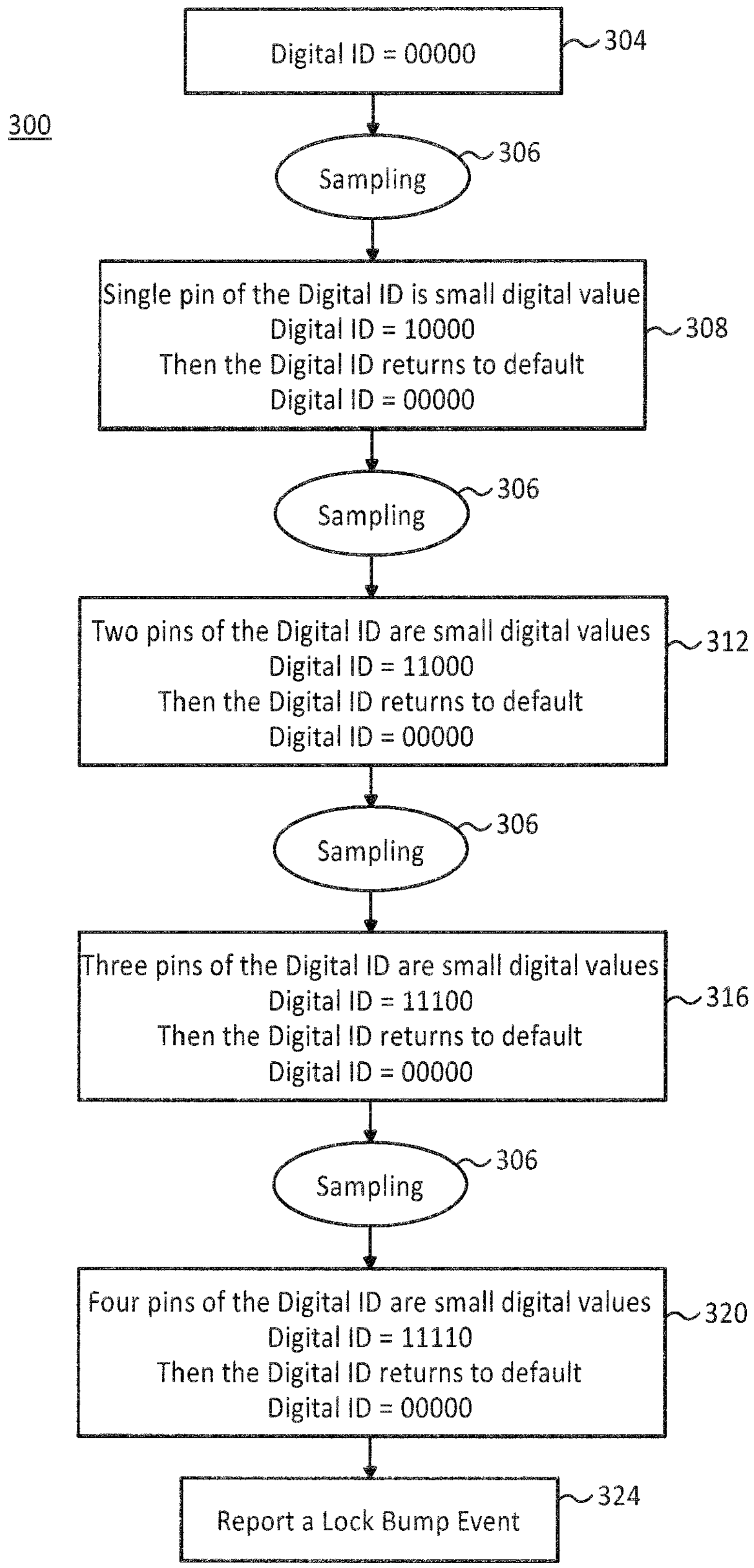
FIG. 10 is a flow chart of another method according to an embodiment of the invention including lock bumping.

Referring to FIG. 10, a flow chart of an embodiment of a method 300 for monitoring a security system is an example of detection of lock bumping to compromise a lock. The method 300 includes, in step 304, a digital identification (ID) of all zeros, i.e., a default position, is determined relating to the pins 24 in the lock 20. A sampling of the pin positions is initiated by the control device 60, in step 306, using the access device 22 to periodically determine current pin 24 positions in the lock 20. In step 308, a pin of the digital ID is determined to have changed and then returned to the default position, e.g., 10000 to 00000. Another sampling is taken in step 306, two pins are determined to change value and then return to the default value, e.g., 11000 to 00000, in step 312. After another sampling is taken in step 306, three pins are determined to change value and then return to the default position, in step 316. Another sampling, step 306, determines that four pins are changed and then return to the default, in step 320. The control device 60 determines that the pin movement indicates a lock bumping attempt and reports a lock bumping tamper event to a receiving device, in step 324.

Figure 11:
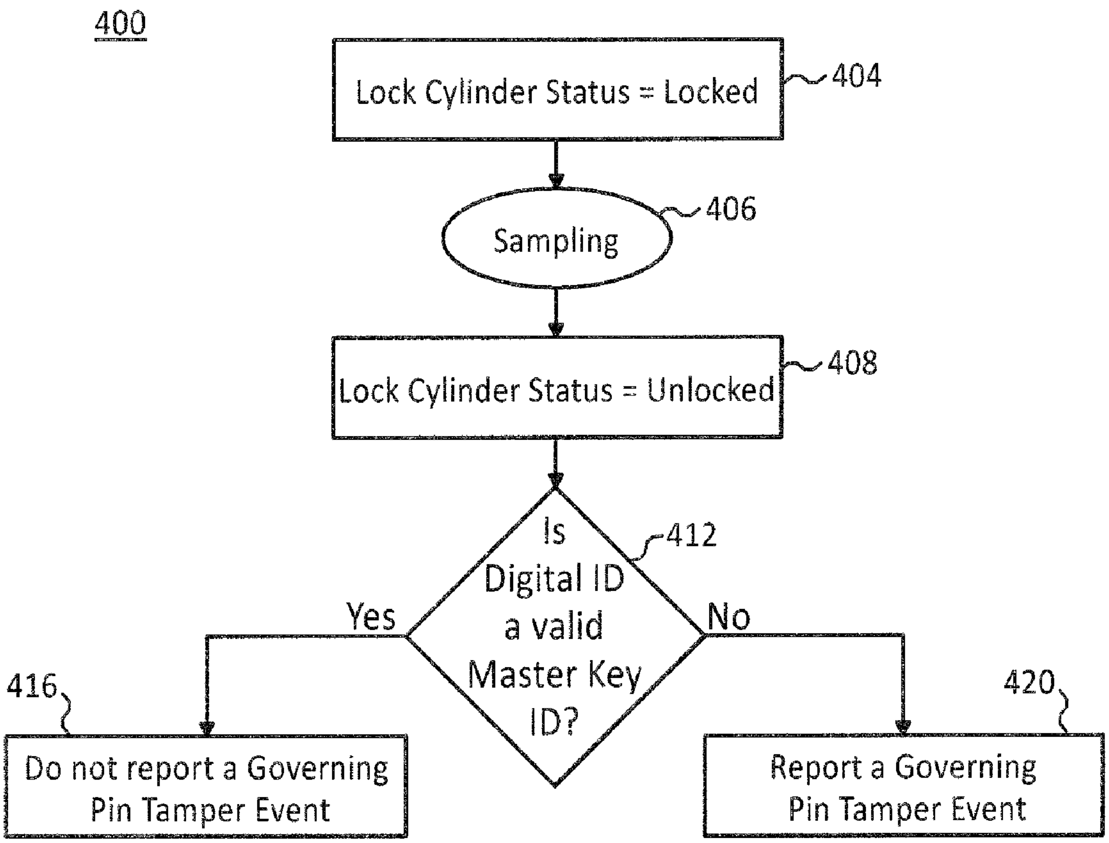
FIG. 11 is a flow chart of another embodiment of the invention for detecting a lock compromising technique on governing pins of a lock.

Referring to FIG. 11, a flow chart of an embodiment of a method 400 for monitoring a security system is an example of detecting lock picking or lock bumping of governing pins to compromise a lock. The method 400 includes, in step 404, the control device 60 determining that the lock cylinder status is locked. A sampling of the pin positions is initiated by the control device 60, in step 406, using the access device 22 to periodically determine current governing pin 90 positions in the lock 80, shown in FIG. 5. After the sampling in step 406, the control device 60 determines that the lock cylinder status is unlocked, in step 408. The method 400 continues to step 412 to determine if the digital ID received from the governing pin 90 movement of the lock 80 is a valid master key ID. If the key ID is valid, the event is not reported, step 416. If the master key ID is not valid, that is, the governing pin 90 movement or lack thereof does not match the key code for the governing pins 90 to open the lock 80, the control device 60 reports a tamper event in step 420.

Thereby, the present invention solves the problem detecting a tamper event such as a lock compromising event of a mechanical lock by measuring the key presses or movement of the pins in the lock to determine a tamper event, and is particularly useful in a duel access security system having electronic access and a lock. The movement is analyzed by the control device 60 to determine a tamper event. The control device 60 records the event and may control additional pins, such as the solid governing pins 90 in FIG. 5 in the lock 80.

Thereby, the present invention provides complete accountability of all entries into a secure area 15 through the door 18, as well as, attempted tamper event. The system and method of the present invention is also advantageous where a multiplicity of electronic access and mechanical locks coexists in a series, for example, on the same floor of a building, for example, as in U.S. patent application Ser. No. 11/782,557, incorporated by referenced hereinbefore.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A security system for monitoring access to a secure area, comprising:

a lock having a locked and unlocked position for controlling access to a secure area, the lock including pins for locking and unlocking the lock, the pins including a predetermined position for unlocking the lock, the lock defining a key passageway for unlocking the lock using a key;

an electronic access device communicating with the pins for electrically measuring movement of the pins and determining a unlock pin code from the predetermined position of the pins for unlocking the lock, the electronic access device electrically measuring pin movement by a lock opening element inserted into the key passageway and the electronic access device generating a pin movement data set from measuring the pin movement; and a control device electrically communicating with the electronic access device, the control device comparing the pin movement data set to at least one predetermined security event pin movement data set and determining when the pin movement data set matches the security event pin movement data set for initiating a tamper alert signal.

2. The system of claim 1, wherein the predetermined security event pin movement data set includes a specified pin movement pattern, and the control device comparing pin movement data set to the pin movement pattern of the predetermined security event pin movement data set to determine the security event.

3. The system of claim 1, wherein the control device identifies a lock compromising technique when the pin movement data set includes a series of movements of the pins in a specified period of time.

4. The system of claim 3, wherein the control device identifies a lock bumping technique for compromising the lock includes a pin movement data set having a smaller period of time than a period of time for a lock picking technique for compromising the lock.

5. The system of claim 3, wherein the control device identifies a lock picking technique for compromising the lock when the pin movement data set includes pin movement in a predetermined period of time.

6. The system of claim 1, wherein the electronic access device electrically measures pin movement by a key and determines a key code for the key from pin movement, and the control device controls access to the secure area using at least one governing pin in the lock, the control device allows access using the governing pin when the key code matches the unlock pin code and denies access using the governing pin when the key code does not match the unlock pin code.

7. The system of claim 1, wherein the control device communicates an alert signal to a remote monitoring station.

8. The system of claim 1, wherein a plurality of lock opening elements include the key, a modified key for initiating a lock bumping technique for compromising the lock, and a lock pick for initiating a lock picking technique for compromising the lock.

9. The system of claim 1, wherein the control device identifies pin movement from a valid key inserted into the key passageway as matching the unlock pin code, and the control device identifies pin movement from an invalid key inserted into the key passageway as not matching the unlock pin code.

10. A method for monitoring access to a secure area, comprising:

controlling access to a secure area using a lock having a locked and unlocked position, the lock including pins for locking and unlocking the lock, the pins including a predetermined position for unlocking the lock, the lock defining a key passageway for unlocking the lock using a key;

electrically measuring movement of the pins and determining a unlock pin code from the predetermined position of the pins for unlocking the lock using an electronic access device communicating with the pins;

electrically measuring pin movement by a lock opening element inserted into the key passageway using the electronic access device;

generating a pin movement data set from measuring the pin movement using the electronic access device;

comparing the pin movement data set to at least one predetermined security event pin movement data set using a control device electrically communicating with the electronic access device; and determining when the pin movement data set matches the security event pin movement data set for initiating a tamper alert signal.

11. The method of claim 10, further comprising:

defining a specified pin movement pattern being included in the predetermined security event pin movement data set; and comparing the specified pin movement pattern with the pin movement data set using the control device to determine the security event.

12. The method of claim 10, further comprising:

identifying a lock compromising technique using the control device when the pin movement data set includes a series of movements of the pins in a specified period of time.

13. The method of claim 12, further comprising:

identifying a lock bumping technique for compromising the lock which includes a pin movement data set having a smaller period of time than a period of time for a lock picking technique for compromising the lock.

14. The method of claim 12, further comprising:

identifying a lock picking technique for compromising the lock when the pin movement data set includes pin movement in a predetermined period of time.

15. The method of claim 10, further comprising:

measuring pin movement by a key and determining a key code for the key from pin movement; and controlling access to the secure area using at least one governing pin in the lock, wherein the control device allows access using the governing pin when the key code matches the unlock pin code and denies access using the governing pin when the key code does not match the unlock pin code.

16. The method of claim 10, further comprising:

communicating an alert signal to a remote monitoring station.

17. The method of claim 10, further comprising:

identifying pin movement from a valid key inserted into the key passageway as matching the unlock pin code; and identifying pin movement from an invalid key inserted into the key passageway as not matching the unlock pin code.

* * * * *